(12) United States Patent
Tani et al.

(10) Patent No.: US 7,153,196 B2
(45) Date of Patent: Dec. 26, 2006

(54) METHOD OF POLISHING USING A POLISHING AGENT

(75) Inventors: Yasuhiro Tani, 3-47-12 Miyanosaka, Setagaya-ku, Tokyo 156-0051 (JP); Lu Yishen, Tokyo (JP)

(73) Assignees: Nihon Microcoating Co., Ltd., Tokyo (JP); Yasuhiro Tani, Tokyo (JP)

( * ) Notice: Subject to any disclaimer, the term of this patent is extended or adjusted under 35 U.S.C. 154(b) by 292 days.

(21) Appl. No.: 10/006,977

(22) Filed: Dec. 4, 2001

(65) Prior Publication Data

US 2002/0061651 A1  May 23, 2002

(30) Foreign Application Priority Data

Apr. 21, 2000 (JP) ............................. 2000-120398

(51) Int. Cl.
*B24B 1/00* (2006.01)
(52) U.S. Cl. ............................. 451/36; 451/41; 451/63
(58) Field of Classification Search .................. 51/297, 51/307, 308, 309; 451/36, 41, 59, 63, 330
See application file for complete search history.

(56) References Cited

U.S. PATENT DOCUMENTS 3,650,714 A * 3/1972 Farkas ........................ 51/295
5,470,893 A * 11/1995 Sinclair-Day et al. ...... 523/205
5,876,490 A * 3/1999 Ronay ............................ 106/3
5,908,719 A * 6/1999 Guckel et al. .................. 430/5
6,074,283 A * 6/2000 Maeda et al. .................. 451/53
6,219,200 B1 * 4/2001 Waki et al. .................. 360/126
6,270,395 B1 * 8/2001 Towery et al. ................. 451/41

FOREIGN PATENT DOCUMENTS

JP   410113874 A  *  5/1998
JP   411114808 A  *  4/1999

* cited by examiner

Primary Examiner—Timothy V. Eley
(74) Attorney, Agent, or Firm—Beyer Weaver & Thomas LLP

(57) ABSTRACT

A polishing agent for polishing a surface of a target object without unduly scratching it includes mother particles and very fine abrading particles which are supported on the surfaces of the mother particles and remain so supported during a polishing process, becoming reattached if removed. Such an agent is produced by adding the mother particles into the abrading particles and stirring them together. In a polishing process, a specified amount of such an agent is supplied onto a lapping plate and a lapping process is carried out while the plate is rotated at a specified rotational speed.

1 Claim, 6 Drawing Sheets

METHOD OF POLISHING USING A POLISHING AGENT

Priority is based on Japanese Patent Application 2000-120398 filed Apr. 21, 2000 and PCT application PCT/JP01/02364 filed Mar. 23, 2001.

BACKGROUND OF THE INVENTION

This invention relates to a method of producing a polishing agent comprised of mother particles and very fine abrading particles, and in particular such a polishing agent comprised of mother particles on the surfaces of which very fine abrading particles are supported, as well as a method of polishing by using such a polishing agent.

Cloths of various kinds with free abrading particles are recently being used for the fine finishing in the production of high-tech electronic devices such as semiconductor substrates and magnetic disc substrates. In such a process, elastic cloths such as woven cloths, unwoven cloths and foamed substances are used for producing mirror surfaces. About 30 years ago, it was mostly woven cloths that were being used, but since the woven texture had adverse effects on the roughness and unevenness, they have gradually ceased to be used and unwoven cloths have come to be used mostly. Since unwoven cloths have unevenness in the density, however, it has been pointed that they also have adverse effects in the fine-scale unevenness. Thus, the use of foamed substances are now beginning to increase.

Recently, there is an increasing demand for processing with high precision in shape, and harder polishing cloths are coming to be favored. There are problems, however, with the use of a hard cloth such as the difficulty in achieving required roughness and the tendency to produce scratches. In view of such problems, there has also been a proposal to use a double-layered polishing cloth with a hard resin layer and a soft resin layer superposed one over the other.

Such prior art polishing agents and methods have many problems. Firstly, for example, the surface roughness of prior art polishing cloths becomes quickly diminished, and both scraped materials and the polishing materials become accumulated with the time of use such that the polishing efficiency is adversely affected. For this reason, the common practice is to use a diamond grinder to rework the cloth surface, which is a process referred to as the "conditioning". This process tends to shorten the useful lifetime of the polishing cloth, and there is the problem of abrading particles dropping off from the diamond grinder and scratching the target surface being polished.

Secondly, since polishing cloths have a thickness of about 2-3 mm, their elastic deformation is relatively large and they sometimes come into a direct contact themselves with the target surface, thereby increasing the frictional resistance and hence also the power consumption by the polishing machine.

Recently, furthermore, it is sometimes required to polish a surface with a large diameter and accordingly larger polishing machines are coming to be used. In order to be used on such a larger polishing machine, the size of polishing cloths is also increasing. It takes the skill of a highly experienced worker to attach a large polishing cloth uniformly over the plate of a polishing machine.

SUMMARY OF THE INVENTION

It is therefore an object of the invention to provide a method of producing a polishing agent and a polishing method with a durable polishing capability for an extended period of use, reducing unnecessary frictional resistance not directly contributing to the polishing and not requiring reattachment of a cloth material.

A polishing agent embodying this invention, with which the above and other objects can be accomplished, may be characterized as comprising mother particles and very fine abrading particles on the surfaces of the mother particles. These abrading particles are supported on the surfaces of the mother particles during a polishing process and, if removed from a portion of the mother particle's surface, become reattached to the surface of a mother particle. The average diameter of the abrading particles is $1/500$–$1/5$ of that of the mother particles. Such a polishing agent can be produced by adding mother particles into a polishing liquid having the very fine abrading particles dispersed therein and by stirring the mixture.

Such an agent may be used according to a method of this invention by supplying a specified amount of the agent between a target object to be polished and a flat and smooth polishing means such as a lapping plate or a tape and causing the polishing means to undergo a motion such as a rotary motion relative to the target object for carrying out a lapping process.

By means of a polishing agent and a polishing method of this invention, an object can be polished without using a polishing pad or anything wasteful which does not directly contribute to the polishing. By a method of this invention, the polishing efficiency can be improved by 20–50% and the throughput can be increased. Moreover, the polishing machine can be miniaturized for the space-saving advantage.

DETAILED DESCRIPTION OF THE INVENTION

Figure 1:
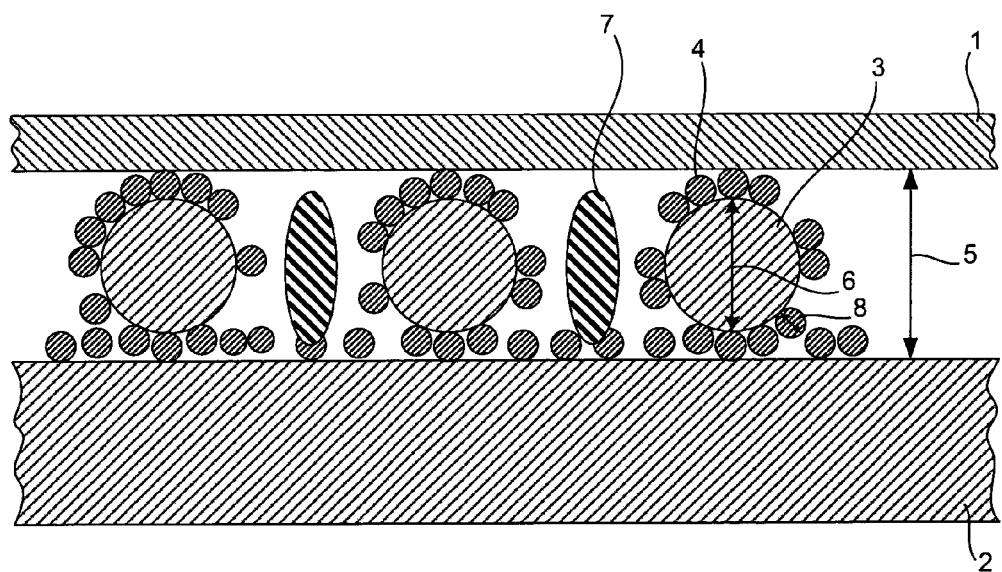
FIG. 1 is a sectional view showing the polishing process using a polishing agent embodying this invention.
Figure 2A:
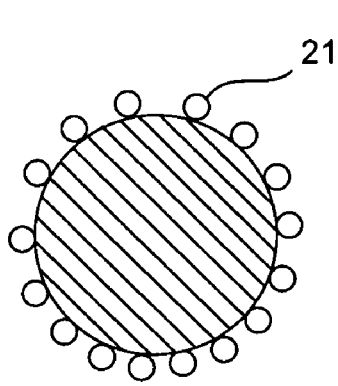
FIGS. 2(a), 2(b), 2(c), 2(d) and 2(e) (together referred to as FIG. 2) show mother particles of other types according to this invention.
Figure 2B:
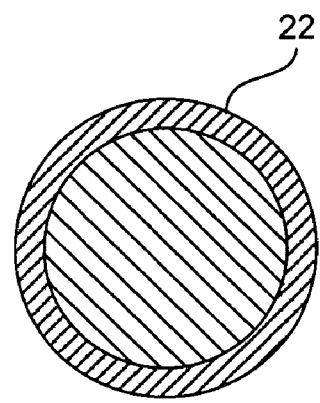
Figure 2C:
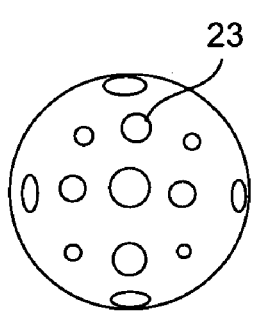
Figure 2D:
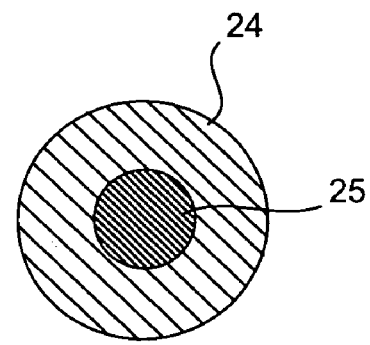
Figure 2E:
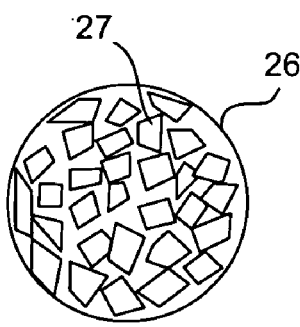

In what follows, the invention is described with reference to the drawings. FIG. 1 is a sectional view of a polishing agent embodying this invention, having been supplied on a lapping plate 2 and being used for polishing a target object 1.

The polishing agent for polishing the surface of the target object 1 is comprised of mother particles 3 and very fine abrading particles 4 attached to the surfaces of these mother particles 3. During the polishing process, the abrading particles 4 remain supported on the surfaces of the mother particles 3. The invention is characterized wherein the abrading particles 4, if removed from the surfaces of the mother particles 3 during a polishing process, become reattached to the portions of the surfaces from which they have been removed. The average diameter of the very fine abrading particles 4 is $1/500$–$1/5$, and preferably $1/200$–$1/20$, of that of the mother particles 3.

According to a preferred embodiment of the invention, the mother particles 3 are spherical polymers and the average diameter (indicated by numeral 8) of the abrading particles 4 is 1/500–1/5, and preferable 1/200–1/20, of the average diameter (indicated by numeral 6) of such spherical polymers. Since these spherical polymers are elastic, they do not leave any scratch marks on the surface of the target object 1 by a lapping process. The spherical polymers 3 according to this invention may be porous with small holes of sizes 200–1000 Å.

Such spherical polymers may be comprised of one or more selected from urethane, nylon, polyimides and polyesters. The very fine abrading particles 4 may be comprised of one or more selected from colloidal silica, alumina and cerium oxide.

The spacing (indicated by numeral 5) between the target object 1 to be polished and the lapping plate 2 (which are practically in contact with each other in the sense of in a pressure-communicating relationship) is substantially equal to the average diameter 6 of mother particles 3. Empty spaces 7 between mutually adjacent pairs of the mother particles 3 serve as a pocket, preventing scratches. Polishing agents according to this invention are usable for the fine polishing of magnetic disk substrates, semiconductor wafers and liquid crystal display panels.

Micro-beads other than polymers as described above may also be used as the mother particles. The average diameter of micro-beads to be thus used is in the range of 0.1–300 □ m, and preferably 1–20 □ m. Such micro-beads may contain small holes of 200–1000Å. Practical examples include those containing one or more kinds selected from carbon micro-beads, glass beads, acryl beads and mesocargon beads which are all available commercially (say, from Osaka Gas Co. and Simicon Composite Co.)

FIG. 2 shows mother particles of other types according to this invention. FIGS. 2(a), 2(b) and 2(c) show examples obtained by modifying the surface of a mother particle illustrated in FIG. 1. FIG. 2(a) shows an example characterized as supporting micro-particles 21 of silica or the like on its surface. FIG. 2(b) shows another example characterized as having a single molecular layer 22 on its surface. FIG. 2(c) shows still another example characterized as having indentations 23 formed on its surface. FIG. 2(d) shows a mother particle comprised of an outer shell 24 with a hollow internal space 25 which may be filled with a core material or left empty. The outer shell may comprise a polymer material or a metal. The core material may comprise a solid such as a metal or a polymer material. The hollow internal space 2 may be filled with a gas or a liquid. FIG. 2(e) shows another mother particle comprising composite particles structured as a hollow polymer 26 containing therein one or more micro-capsules.

Figure 3A:
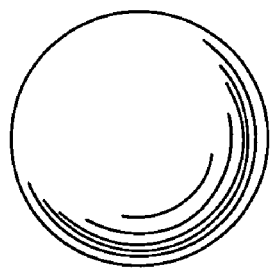
FIGS. 3(a), 3(b), 3(c), 3(d) and 3(e) (together referred to as FIG. 3) show mother particles according to this invention in different shapes.
Figure 3B:
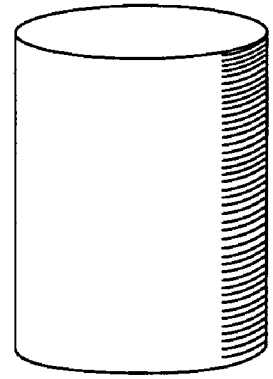
Figure 3C:
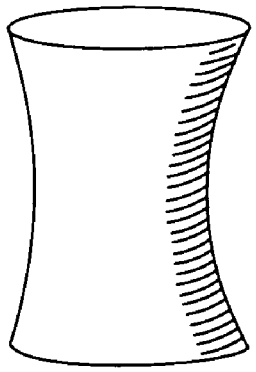
Figure 3D:
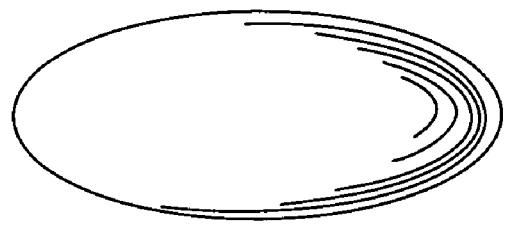
Figure 3E:
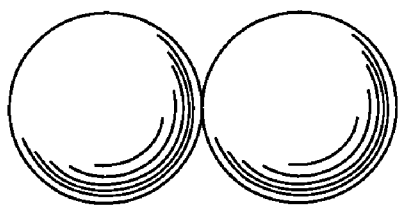

FIG. 3 shows mother particles according to this invention in different shapes, FIG. 3(a) showing a spherical shape with two axes of symmetry, FIGS. 3(b), 3(c) and 3(d) showing cylindrical shapes with one axis of symmetry, and FIG. 3(e) showing a composite of two spherical parts.

Polishing agents embodying this invention as described above may be produced by adding mother particles to very fine abrading particles and stirring them together.

A polishing method embodying this invention is characterized as comprising the steps of supplying a specified amount of a polishing agent according to this invention between a target object to be polished and a polishing means and causing the polishing means to undergo a movement relative to the target object while in contact therewith. During this process, these very find abrading particles are believed to remain attached to the surfaces of the mother particles by the electrostatic, van der Waals or mechanical force.

Examples of the aforementioned polishing means include tapes and lapping plates. Flat and smooth tapes are preferred for this purpose, such as PET tapes. Flat and smooth lapping plates made of a metallic material such as copper and tin or a ceramic or plastic material may be suitably used. The lapping plate need not have a flat surface but may have a curved polishing surface such as a spherical surface or an uneven surface with indentations and protrusions. With the use of such a plate, prior art polishing pads such as comprising urethane as well as tapes become dispensable with the polishing agent of this invention being applied directly on the lapping plate, and the problems related to flatness and small-scale evenness can be properly addressed to.

A polishing agent of this invention is preferably supplied at a rate of 1–100 cc/min, and preferably 20–50 cc/min. When a lapping process is carried out on the target object 1 while rotating the lapping plate 2, the speed of rotation is 10–10000 rpm, and preferably 100–1000 rpm.

Test experiments are explained next in order to more clearly describe the invention. In these test examples, micro-polymers were used as micro-beads.

As very fine abrading particles according to this invention, use was made of colloidal silica (Snowtex 30 (pH 10.5) produced by Nissan Kagaku Kabushiki Kaisha) of which specifications are given below in Table 1.

TABLE 1

| | |
|---|---|
| Content of anhydrous silicic acid ($SiO_2$) | 30–31 weight % |
| Content of sodium oxide ($Na_2O$) | Less than 0.6 weight % |
| Concentration of hydrogen ion | pH 9.0–10.5 |
| Particle diameters | 10–20 nm |
| Viscosity at 25° C. | Less than 6mP |
| Specific weight at 20° C. | 1.20–1.22 |

Figure 4A:
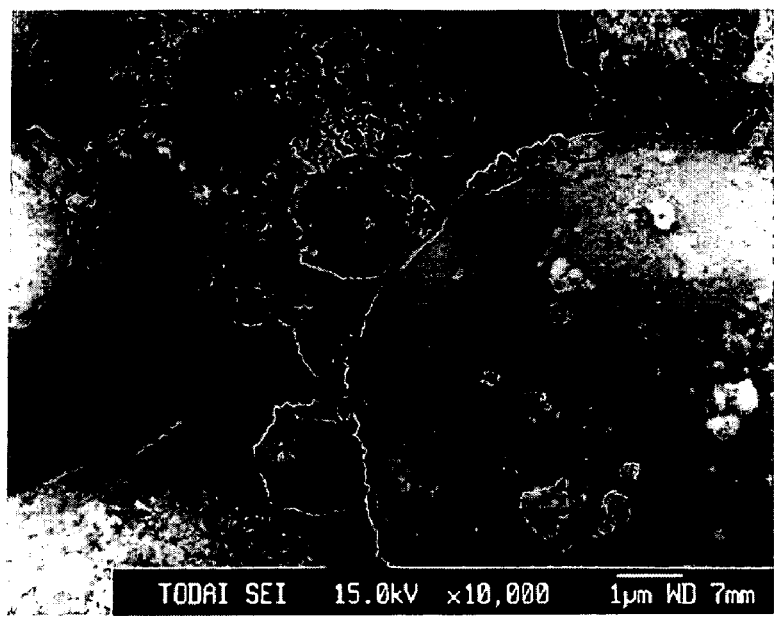
FIGS. 4(a), 4(b), 4(c), 4(d), 4(e) and 4(f) are photographs by electron microscope of a polishing agent embodying this invention.
Figure 4B:
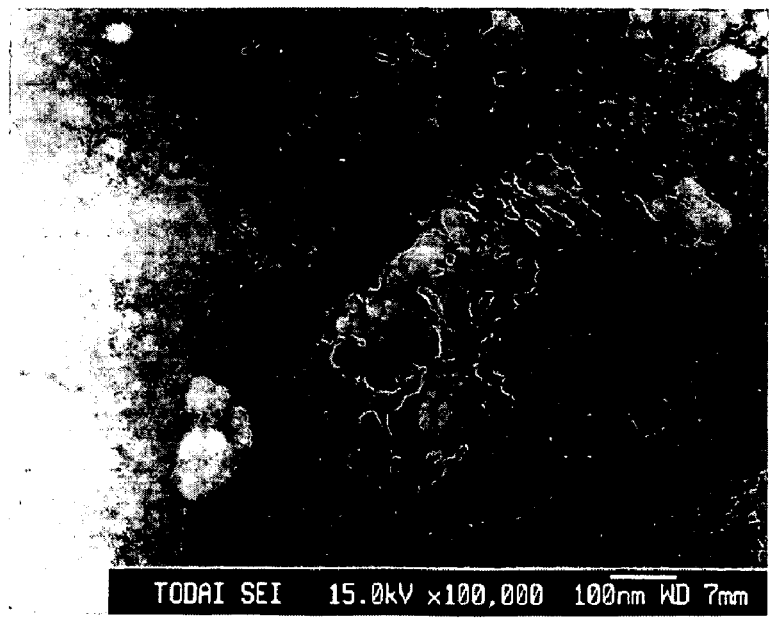

As mother particles (micro-polymers) according to this invention, use was made of two kinds of benzoguanamine resin (Epostar L15 and Epostar MS produced by Nippon Shokubai Kabushiki Kaisha) of which specifications are given below respectively in Tables 2 and 3. FIG. 4(a) is an SEM (scanning electron microscope) photograph of original powder of Epostar L15, and FIG. 4(b) is its enlargement. A small amount of residual silica is discernible on the surface of micro-polymer.

TABLE 2

| Constituent | Benzoanamine-formaldehyde resin | Silica | Nonion surfactant |
|---|---|---|---|
| Content | 94% | 5% | 1% |
| Chemical formula | $(C_9H_9N_5.CH_2O)_2$ | $SiO_2$ | |
| Reference Number in Government Publication | (7)-555 | (1)-548 | 7-559 |
| Diameter of spherical shape | Average diameter = 10–20□m; Maximum = 30□m; Minimum = 8□m | | |

TABLE 3

| Constituent | Benzoanamine-formaldehyde resin | Silica | Nonion surfactant |
|---|---|---|---|
| Content | 89.8% | 10% | 1% |
| Chemical formula | $(C_9H_9N_5.CH_2O)_2$ | $SiO_2$ | |

TABLE 3-continued

| Constituent | Benzoanamine-formaldehyde resin | Silica | Nonion surfactant |
|---|---|---|---|
| Reference Number in Government Publication | (7)-555 | (1)-548 | 7-559 |
| Diameter of spherical shape | Average diameter = 1–3 μm; Maximum = 10 μm; Minimum = 0.5 μm | | |

Figure 4C:
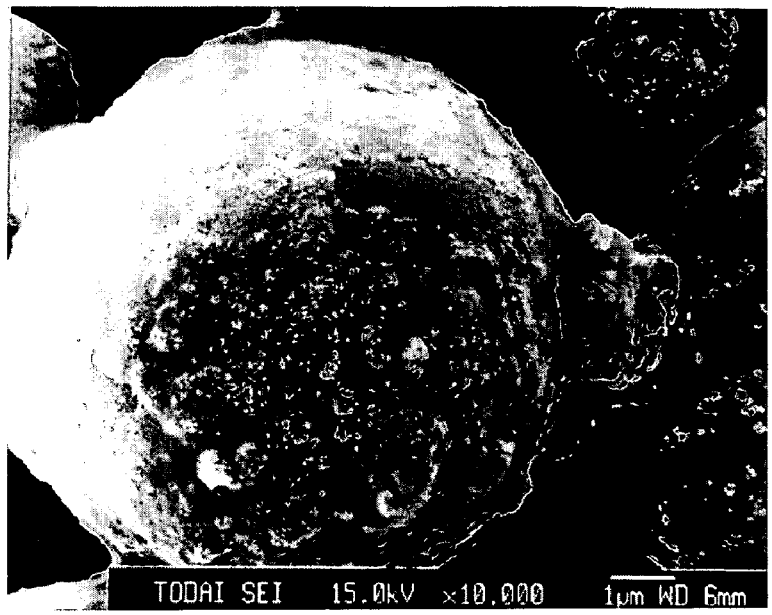
Figure 4D:
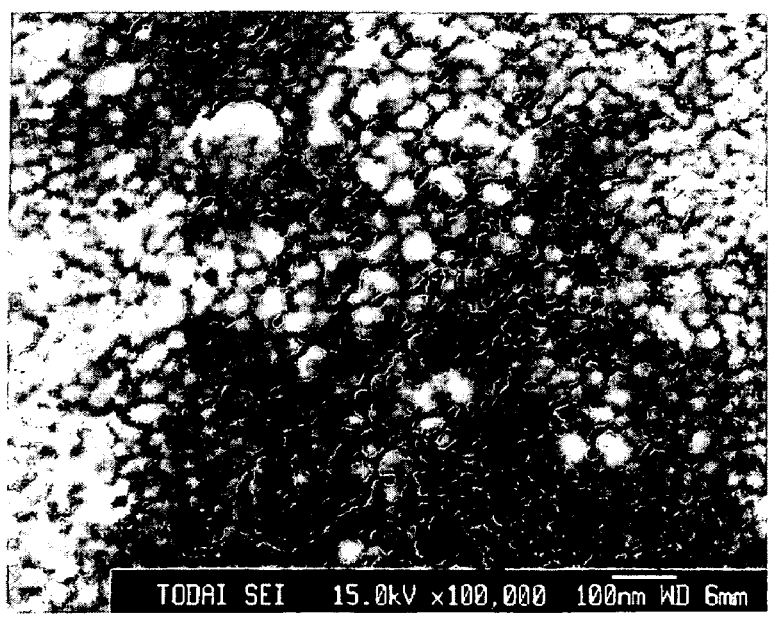

Micro-polymers described above were added into colloidal silica described above with stirring. Composition of the polishing agent thus produced in this example was as shown in Table 4. FIG. 4(c) is an SEM photograph of this polishing agent (Epostar L15+ colloidal silica) after being dried. FIG. 4(d) is its enlargement, showing colloidal silica attached approximately evenly on the surface of Epostar L15 powder.

TABLE 4

| Micro-polymer | 0.5–5 weight % |
|---|---|
| Colloidal silica | 5–10 weight % |
| Pure water | 85–94.5 weight % |

Figure 4E:
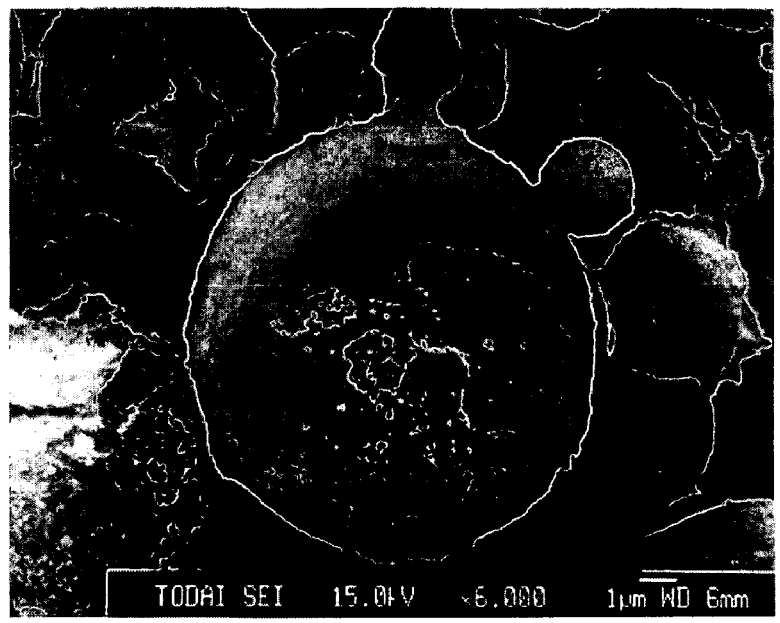
Figure 4F:
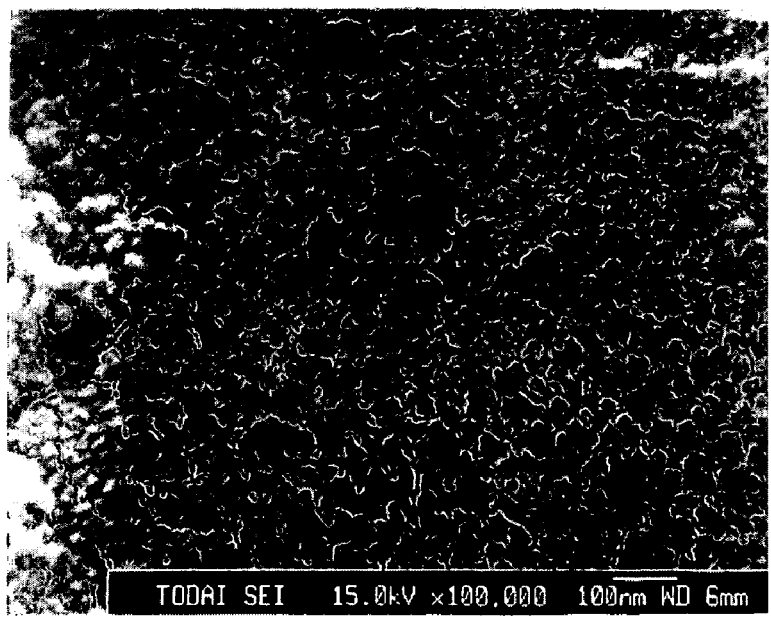

A plane polishing process was carried out on a 4-inch silicon wafer by using a plane polishing disc produced by Okamoto Kikai Co. The applied pressure was 300 gf/cm$^2$, the diameter of the lapping plate was 260 mm, the rotary speed of the lapping plate was 64 rpm, the polishing agent was added at the rate of 25 cc/min and the processing time was 20 minutes. FIG. 4(e) is an SEM photograph of the micro-polymer slurry after the polishing process and FIG. 4(f) is its enlargement, showing colloidal silica removed from portions of the surface of the micro-polymer because of the polishing process.

By this polishing process according to the present invention, surface roughness of $R_a$=2.0–2.5 nm could be accomplished. This is comparable to the result of polishing by using a normal IC1000 polishing pad with colloidal silica. This means that the present invention is capable of bringing about an improvement in the polishing efficiency by about 20–50% over the prior art methods. It was also ascertained that the torque on the lapping plate (that is, the displacement resistance of the target object being polished with respect to the lapping plate with the presence of the micro-polymer slurry in between) was reduced by 20–30%. In other words, a smaller power source can be used and the device can be miniaturized accordingly.

What is claimed is:

1. A method of using a polishing agent comprising mother particles and abrading particles on surfaces of said mother particles and a lapping plate made of a metallic or ceramic material to polish a target object; said method comprising the steps of;

supplying a specified amount of said polishing agent directly between said lapping plate and said target object to be polished, said lapping plate having a flat and smooth surface with a diameter greater than that of said target object and said mother particles comprising spherical polymers and having an average diameter of 1–20 μm, the average diameter of said abrading particles being 1/200–1/20 of the average diameter of said mother particles; and causing said lapping plate to rotate at a specified rotational speed so as to move relative to said target object while keeping said lapping plate practically in contact with said target object while a lapping process is carried out on said target object.

* * * * *